(12) United States Patent
Maruyama et al.

(10) Patent No.: US 7,083,105 B2
(45) Date of Patent: Aug. 1, 2006

(54) IC CARD AND METHOD OF OPERATING THE SAME

(75) Inventors: Kenji Maruyama, Kawasaki (JP); Mineharu Tsukada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/361,587

(22) Filed: Feb. 11, 2003

(65) Prior Publication Data

US 2003/0169574 A1     Sep. 11, 2003

(30) Foreign Application Priority Data

Mar. 8, 2002   (JP) .............................. 2002-063951

(51) Int. Cl.
*G06K 19/06*     (2006.01)
(52) U.S. Cl. ...................... 235/492; 235/380
(58) Field of Classification Search ................ 235/492; 345/87
See application file for complete search history.

(56) References Cited

U.S. PATENT DOCUMENTS

| | | | | |
|---|---|---|---|---|
| 4,278,000 A | * | 7/1981 | Saito et al. ..................... | 84/731 |
| 4,750,817 A | * | 6/1988 | Sammells ...................... | 359/270 |
| 5,367,041 A | * | 11/1994 | Wudl et al. .................... | 528/167 |
| 6,297,789 B1 | * | 10/2001 | Gauthier et al. .............. | 345/87 |
| 6,523,754 B1 | * | 2/2003 | Hoshino et al. ............... | 235/492 |
| 6,611,096 B1 | * | 8/2003 | McCormick et al. ......... | 313/506 |
| 6,712,276 B1 | * | 3/2004 | Abali et al. ................... | 235/492 |

FOREIGN PATENT DOCUMENTS

| | | | |
|---|---|---|---|
| JP | 402307792 A | * | 12/1990 |
| JP | 11-232412 | | 8/1999 |
| JP | 2000-322549 | | 11/2000 |
| JP | 2001-283176 | | 10/2001 |

OTHER PUBLICATIONS

Luo et al. "Thin film PZT pressure/temperature sensory arrays for on-line monitoring of injection molding", Industrial Electronics Society, 2001. IECON '01. The 27th Annual Conference of the IEEE , vol. 1 , Nov. 29-Dec. 2, 2001 p. 3.*

* cited by examiner

*Primary Examiner*—Seung H Lee
(74) *Attorney, Agent, or Firm*—Westerman, Hattori, Daniels & Adrian, LLP.

(57) ABSTRACT

The present invention aims to provide an IC card, requiring no special additional devices, not causing a liquid leakage of an aqueous electrolyte, requiring no battery, and capable of displaying information easily and cheaply by internally generated electric power and remaining the information even after the voltage is stopped applying. An IC card of the present invention has an electric power generator capable of generating electric power by an external stimulus and a display driven by the generated electric power so as to display information. The IC card of the present invention preferably have aspects of that the electric power generator is a piezoelectric transducer, a nonvolatile memory for storing information displayed on the display is provide, the nonvolatile memory is a ferroelectric memory, the display is formed by an electrochromic display device, and the electrochromic display device is an all solid-state electrochromic display device.

16 Claims, 3 Drawing Sheets

IC CARD AND METHOD OF OPERATING THE SAME

CROSS-REFERENCE TO RELATED APPLICATIONS

This application is based upon and claims the benefits of priority from the prior Japanese Patent Application No. 2002-063951, filed in Mar. 8, 2002, the entire contents of which are incorporated herein by reference.

BACKGROUND OF THE INVENTION

1. Field of the Invention

The present invention relates to an IC card which can be suitably used in various fields of a finance/settlement field, a public utility field, a communication/broadcasting field, a transportation/traffic field, a distribution/retail service field, and an ID field, of which handling is easy, and of which information can be visually recognized. The present invention also relates to a method of operating an IC card.

2. Description of the Related Art

Recently, research and development of an IC card is actively being made. The IC card is generally formed by mounting an IC chip or the like, which is capable of storing information, on a plastic card having a size of credit card. Since the IC card has excellent portability, high function, and high performance, application of the IC card is being examined in various fields. The IC card is divided into a contact IC card and a contactless IC card. The contact IC card is designed to come into electric contact with a terminal such as a reader/writer to receive power and transmit/receive data to/from the terminal. The contactless IC card is designed to receive power by using electromagnetic waves and so as to be able to transmit/receive data to/from a terminal such as a reader/writer without electric contact.

In the IC card, desirably, stored information such as information of a use state (whether the IC card is unused or in use, a used rate, a remaining amount, and the like) can be easily recognized.

Hitherto, as known by a telephone card, a prepaid card, and the like, the information such as the use state is recorded by punching, thermal recording using a photosensitive recording material, and the like.

In any of the cases, however, a terminal is required to equip a special function such as a punching function or a heating function, moreover, the terminal and a card have to come into contact with each other. Since any of the cards does not have a display portion, in order to check the information such as a use state, the user has to go to a station or a commercial facility where a card reader installed or has to have a personal card reader.

Hitherto, a method of assembling a liquid crystal display in the IC card and using a supporting member for reinforcement so as to have bending strength is proposed in, for example, Japanese Patent Application Laid-Open (JP-A) No. 2001-283176 and the like.

In this case, however, the method has the following problems:

(1) It is necessary to equip a power supply source such as a battery in the IC card.
(2) Since the liquid crystal display, the battery, and the like need to be deposed within the IC card standard thickness of 0.76 mm, it is difficult to design assembly of the aforementioned parts with such a limited space.
(3) When assembly of the liquid crystal display, the battery, and the like is facilitated, disassembly becomes easy. If disassembly is easy, even internal analysis becomes easy, so that the card is easily forged.
(4) As the manufacturing process is complicated, the cost increases.

Conventionally, a method of assembling an electrochromic display device using a viologen compound is proposed in, for example, JP-A No. 11-232412 and the like. In this case, however, information on a display is maintained only when a low voltage is applied to the display. There is hence a problem of maintaining the information on the display after the voltage is stopped applying. Further, a method of assembling an electrochromic display device using a compound having a triphenylmethane structure in the IC card is proposed in JP-A No. 2000-322549 and the like. In this case, however, an aqueous electrolyte is necessary, so that manufacture of the IC card or the like is complicated and there are problems such as leakage of the liquid and breakage at the time of using the IC card and the like, and spread of the electrolyte liquid when the IC card and the like is discarded.

SUMMARY OF THE INVENTION

An object of the present invention is to provide an IC card and a method of operating the same, which can be suitably used in various fields of a finance/settlement field as a cash card, a credit card, a prepaid card, and the like; a public field as a resident general register, a health insurance card, a driving license, a passport, and the like; a communication/broadcasting field of a telephone card, a user identification module (UIM), a satellite broadcasting card, and the like; a transportation/traffic field as a highway card, an ETC card, a railway/subway card, a bus card, and the like; a distribution/retail service field as a department card, a convenience shop card, a shopping card, a vending machine card, a gasoline station card, a car maintenance card, and the like; an ID field as an employee ID card, a door key, a student ID card, and the like; and the other fields as a game card, an amusement facility card, a membership card, and the like, which can be easily designed as a contactless IC card requiring no special additional device, in which there is no fear of a liquid leakage of an electrolyte liquid and the like, it is unnecessary to equip a power supply source such as a battery, and of which information can be displayed easily and cheaply by using the voltage of electricity internally generated, moreover, only for time which does not hinder a practical use even after the voltage is stopped.

An IC card of the present invention has an electric power generator capable of generating electric power by an external stimulus, and a display driven by the electric power generated by the electric power generator so as to display information. In the IC card, the electric power generator generates electric power when it receives a stimulus from outside. The display is driven by the electric power, which is generated by the electric power generator. Consequently, the user can easily understand information of the IC card by visually recognizing the information displayed on the display.

A method of operating an IC card of the present invention, has the following steps. A first step is to apply an external stimulus to an electric power generator so as to generate an electric power in the electric power generator. A second step is to drive a display using the electric power generated by the electric power generator so as to display information on the display. The aforementioned steps may not be necessarily operated in this order. In this method, the IC card comprises an electric power generator capable of generating electric power by applying external stimulus to the IC card, and a display driven by the electric power generated by the electric power generator so as to display aformation thereon.

Another method of operating an IC card of the present invention has the following steps. A first step is to deform the IC card within an elastic deformable range so as to generate electric power in a piezoelectric transducer. A second step is to drive a display by the electric power so as to display information on the display. The aforementioned steps may not be necessarily operated in this order. In this method, the IC card comprises a piezoelectric transducer capable of generating electric power by deforming the IC card within an elastic deformable range, and a display driven by the electric power generated by the piezoelectric transducer so as to display information thereon.

Another method of operating an IC card of the present invention, has the following steps. A first step is to apply an external stimulus so as to generate electric power in the electric power generator. A second step is to drive a display by the electric power so as to display information on the display. A third step is to read the information to be displayed from a nonvolatile memory at the time of displaying the information on the display. The aforementioned steps may not be necessarily operated in this order. In this method, the IC card comprises the electric power generator, the display and the nonvolatile memory. Thus, the information is managed reliably.

Another method of operating an IC card has the following steps. A first step is to deform the IC card within an elastic deformable range so as to generate electric power in an electric power generator. A second step is to drive a display by the electric power so as to display information on the display. A third step is to read the information to be displayed from a nonvolatile memory at the time of displaying the information on the display. The aforementioned steps may not be necessarily operated in this order. In this method, the IC card comprises a piezoelectric transducer, a display and a nonvolatile memory.

Figure 1:
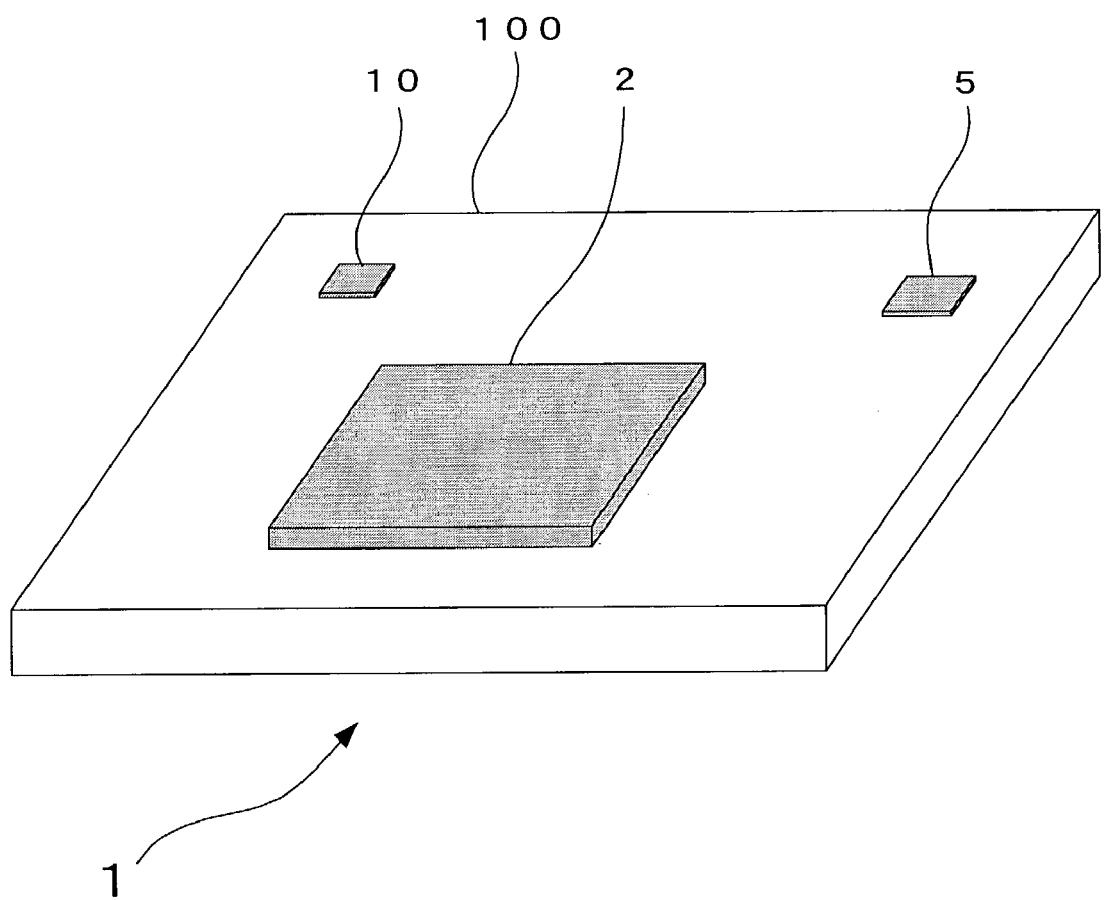
FIG. 1 is a schematic diagram for explaining an example of an IC card of the present invention.

DESCRIPTION OF THE PREFERRED EMBODIMENTS (IC Card)

An IC card of the present invention has an electric power generator, a display. Furthermore, the IC card may have another member which is suitably selected according to the intended purpose.

The electric power generator is not particularly limited as long as it can generate power when receives an external stimulus, and can be suitably selected according to the intended purpose. Examples of the electric power generator are a piezoelectric transducer, a photoelectric transducer, a thermoelectric transducer, an electromagnetic transducer and the like. Any of these can be used singly or in combination of two or more. The number of the electric power generator is not particularly limited, and can be suitably selected according to the intended purpose. The number of the power may be one, or, two or more.

In the case where the electric power generator is the piezoelectric transducer, an IC card having the piezoelectric transducer can be operated while being deformed by bending and the like. In the case where the electric power generator is the photoelectric transducer, an IC card having the photoelectric transducer can be operated by an exposure of the sunlight and the like. In the case where the electric power generator is the thermoelectric transducer, an IC card having the thermoelectric transducer can be operated by an application of heat and the like. In the case where the electric power generator is the electromagnetic transducer, an IC card having the electromagnetic transducer can be operated by being made close to a magnetic force and the like. Among them, the piezoelectric transducer is preferable from the viewpoints of excellent handling of the IC card and prevention of problems such as leakage of information.

The stimulus is not particularly limited and can be suitably selected according to the intended purpose. Examples of the stimulus are pressure, light, heat, magnetic force and the like.

In the case of using the piezoelectric transducer as the electric power generator, any piezoelectric transducer may be used as long as it has a piezoelectric action (piezoelectric effect). The materials of the piezoelectric transducer are not particularly limited and can be suitably selected according to the intended purpose. The materials may be inorganic materials or organic materials. The materials may be used singly or in combination of two or more. It is also preferable to use in combination of the inorganic material and the organic material.

The inorganic materials are not particularly limited and any inorganic materials for the piezoelectric transducer known in the art can be suitably selected. Examples of the inorganic materials are $PbZrTiO_3$ (lead zirconate titanate), $PbLaZrTiO_3$ (lead lanthanum zirconate titanate), $SrBi_2Ta_2O_9$ (strontium bismuth tantalic acid), $(Bi, La)_4Ta_3O_{12}$ (bismuth lanthanium tantalic acid) $Bi_4Ti_3O_{12}$ (bismuth titanate), and the like.

The organic materials are not particularly limited and any organic materials for the piezoelectric transducer known in the art can be suitably selected. Examples of the organic materials are PVDF(polyvinylidene fluoride), polyethylene trifluoride, polyethylene tetrafluoride, P(VDF-TrFE) (a copolymer of vinylidene fluoride and ethylene trifluoride), P(VDF-TetraFE) (a copolymer of vinylidene fluoride and ethylene tetrafluoride), polyvinyl alcohol, polyethylene terephthalate, polyoxymethylene, polyethylene, polypropylene, polyphenyl sulfide, crystalline polystyrene, crystalline polymethyl methacrylate, crystalline polycarbonate, and the like.

A power generation amount of the electric power generator is not particularly limited, and can be suitably selected in the range where the display can be driven. In the case where the electric power generator is the piezoelectric transducer, for example, a bimorph device, as the piezoelectric transducer, of a $PbZrTiO_3$ (lead zirconate titanate) of 60 mm (length)×20 mm (width)×0.6 mm (thickness), obtains a power generation amount of 11V (voltage between peaks) when the IC card is bent with a displacement of 1 mm. Under conditions of using a bimorph device of $PbZrTiO_3$ (lead zirconate titanate) of 170 μm (length)×90 μm (width)× 10 μm (thickness), obtains a power generation amount of 20V (voltage between peaks) when the IC card is bent with a displacement of 170 nm.

The display is not particularly limited as long as it is driven by electric power generated by the electric power generator and capable of displaying information. The display can be suitably selected according to a purpose. For example, the display has to have at least display means and, preferably a memory.

The number of displays is not particularly limited and can be suitably selected according to the intended purpose. The number may be, for example, one, or, two or more. The number of display means in one display is not particularly limited and can be suitably selected according to the intended purpose and may be one, or, two or more. The number of the memories in one display is not particularly limited and can be suitably selected according to the intended purpose and may be one, or, two or more. The number of memories may be one in the whole IC card.

As the display means, any displays known in the art can be suitably selected. Display means which can be driven with a low voltage is preferable from the viewpoints of easy handling of the IC card, simplicity in manufacturing process, safety, cost efficiency of display, and the like. As such display means, for example, an electrochromic display device and the like is preferable. The electrochromic display device has advantages such that it can be driven with 3V, even after the voltage is stopped applying (in a state where electricity is interrupted), a coloring state can be held, and necessary information can be displayed for predetermined time.

As the electrochromic display device (also called an "EC device"), any electrochromic display devices known in the art can be suitably selected. For example, an all solid-state electrochromic display device is preferable with respect to the points such that assembly at the time of manufacturing an IC card is easy, there is no liquid leakage when the card is broken, the device can be manufactured at low cost, and handling and safety are excellent.

Favorable examples of the all solid-state electrochromic display device are a self-doped conductive polymer, a π-conjugated polymer, and the like. Of these, the polymer may be used singly or in combination of two or more.

The self-doped conductive polymer is nor particularly limited and can be suitably selected according to the intended purpose. Preferable examples are poly(isothianaphthene sulfonic acid), poly(thiophene alkane sulfonic acid), poly(pyrrole alkane sulfonic acid), poly(aniline sulfonic acid), poly(carbazole-N-alkane sulfonic acid), poly(phenylene/oxyalkane sulfonic acid), poly(thiophene alkane carboxylic acid), poly(isothianaphthene-5-sulfonic acid-co-isoanaphthene), poly(thiophene-3-alkane sulfonic acid-co-thiophene), poly(pyrrole-3-alkane sulfonic acid-co-pyrrole), poly(aniline sulfonic acid-co-aniline), poly(carbazole-N-alkane sulfonic acid-co-carbazole), poly(phenylene-oxyalkane sulfonic acid-co-phenylene), and poly(thiophene-3-alkane carboxylic acid-co-thiophene). In addition to the above, preferable examples of the self-doped conductive polymer may also include N-vinylcarbon acid amide polymers.

The π-conjugated polymer is not particularly limited and can be suitably selected according to the intended purpose. Preferably examples are polyaniline, poly(o-phenylendiamine), poly(metanilic acid), poly(thiophene-2,5-diyl), poly(3-methylthiophene), poly(3,4-dimehylthiophene), poly(1,3-bis-2-thienyl benzene), polyisothianaphthene, polypyrrole, poly(2,5-pyridinediyl), poly(6-hexyl-2,5-pyridinediyl), poly(1,4-isoquinoline diyl), poly(2,5-pyrimidinediyl), poly(5,8-quinoxaline diyl), polyvinylquaterthiophene, poly(2,6-quinolinediyl), poly(2-methyl-1,4-anthraquinonediyl), and the like.

The relations among oxidation, neutral, and reduction states in the π-conjugated polymers and colors are described as follows. In parenthesis, coloring in each of the oxidation, neutral, and reduction states is shown. (1) polyaniline (oxidation state: bluish green, neutral state: light yellow, reduction state: none), (2) poly(o-phenylenediamine) (oxidation state: red, neutral state: no color, reduction state: none), (3) poly(metanilic acid) (oxidation state: blue, neutral state: no color, reduction state: none), (4) poly(thiophene-2,5-diyl) (oxidation state: blue, neutral state: red, reduction state: none), (5) poly(3-methylthiophene) (oxidation state: deep blue, neutral state: red, reduction state: none), (6) poly(3,4-dimehylthiophene) (oxidation state: deep blue, neutral state: light blue, reduction state: none), (7) poly(1,3-bis-2-thienyl benzene) (oxidation state: green, neutral state: yellow, reduction state: none), (8) polyisothianaphthene (oxidation state: no color, neutral state: yellow, reduction state: none), (9) polypyrrole (oxidation state: violet, neutral state: yellow, reduction state: none), (10) poly(2,5-pyridinediyl) (oxidation state: none, neutral state: yellow, reduction state: reddish purple), (11) poly(6-hexyl-2,5-pyridinediyl) (oxidation state: none, neutral state: yellow, reduction state: dark orange), (12) poly(1,4-isoquinoline diyl) (oxidation state: none, neutral state: light yellow, reduction state: reddish purple), (13) poly(2,5-pyrimidinediyl) (oxidation state: none, neutral state: orange, reduction state: deep purple), (14) poly(5,8-quinoxaline diyl) (oxidation state: none, neutral state: yellow, reduction state: reddish brown), (15) polyvinylquaterthiophene (oxidation state: green, neutral state: yellow, reduction state: none), (16) poly(2,6-quinoline diyl) (oxidation state: none, neutral state; yellow, reduction state: dark blue), and (17) poly(2-methyl-1,4-anthraquinonediyl) (oxidation state: none, neutral state: yellow, reduction state: red).

As the memory, any memory can be used as long as it can store information displayed by the display means and the like, and can be suitably selected from any memory known in the art. A preferable example is a nonvolatile memory.

The nonvolatile memory is not particularly limited and can be selected according to the intended purpose. For example, a ferroelectric random access memory (FeRAM) or the like is preferable. The ferroelectric random access memory (FeRAM) may be assembled in, for example, an LSI and the like.

The ferroelectric random access memory (FeRAM) is not particularly limited. Any ferroelectric memories known in the art can be suitably selected.

Ferroelectrics in the ferroelectric random access memory (FeRAM) have two residual polarization characteristics of different polarities, so that it can be polarized to one of two directions. By discriminating the polarization direction, information of "1" corresponding to polarization in one direction and information of "0" corresponding to polarization in the other direction can be stored. Even after the power source is turned off, the polarization is maintained, so that data is held and nonvolatility is shown.

The ferroelectrics is not particularly limited as long as it shows a charge retaining characteristic by the residual polarization and can function as a nonvolatile memory. The ferroelectrics can be selected from any ferroelectrics known in the art according to a purpose. Ferroelectrics formed by two or more elements can be preferably used.

The material of the ferroelectrics is not particularly limited and can be selected according to a purpose. Materials each having a composition of two or more elements selected from the group of Na, K, Ba, Cd, Hf, O, Pb, Zr, Ti, La, Ca, Sr, Tl, Bi, rare earth elements, Nb, Ta, W, Mo, Fe, Co, Cr, and the like can be mentioned.

One of the materials may be sued singly or combination of two or more.

Examples of the material of the ferroelectrics are a lead-based ferroelectric material and a bismuth-based ferroelectric material.

Preferable examples of the lead-based ferroelectric materials are $PZT(Pb(Zr_xTi_{1-x})O_3)$, $PLZT(Pb_yLa_{1-y}Zr_xTi_{1-x}O_3)$, $PbTiO_3 \cdot xSrTiO_3$, $yLaMnO_3$, $(1-x)Pb(Ti_{1-x}Zr_y)O_3 \cdot xBiFeO_3$, $(Pb_{0.97}La_{0.02})(Zr_{0.92}Ti_{0.08})O_3$, $(Pb_{1-x}Sr_x)(Ti_{1-y}Zr_y)O_3$, and the like.

An example of the suitable bismuth ferroelectric material is SBT ($SrBi_2Ta_2O_9$), and the like.

Any of the ferroelectric materials may contain at least one element selected from La, Ca, and Sr and, further, may contain at least one element selected from Tl, Bi, rare earth element, Nb, Ta, W, Mo, Fe, Co, and Cr.

Concrete examples of the material of the ferroelectric are $PbZrO_3$, $PbTiO_3$, $NaNbO_3$, $KNbO_3$, $NaTaO_3$, $CaTiO_3$, $BaTiO_3$, $PbTiO_3$, $PbZrO_3$, $PbHfO_3$, $CdHfO_3$, $BiFeO_3$, and the like.

The number of the memory is not particularly limited, can be suitably selected according to an object, and may be one, or, two or more.

A method of outputting information stored in the memory to the display means is not particularly limited and can be selected from any methods known in the art. For example, as disclosed in JP-A No. 11-191149 and the like, the ferroelectrics may generate and output a signal under a predetermined condition on the basis of an algorithm stored in the ferroelectrics.

The other members are not particularly limited and can be suitably selected according to a use of the IC card, and the like. For example, a base material of the IC card, a protection layer, wires, a ROM, and the like can be mentioned.

The base material of the IC card is not particularly limited, a shape, a structure, a material, a size, and the like can be suitably selected according to a purpose.

The shape is, for example, generally a rectangular shape. Examples of the structure are a laminated structure and a waterproof structure. A structure preferably has members such as the electric power generator disposed therein.

As the material, a proper material can be selected from any materials of IC card base materials known in the art and its example is a resin. Examples of the rein are a thermoplastic resin, a thermosetting resin, a photo-curing resin, and the like. Concrete examples are polyolefin resins such as polyethylene and polypropylene, styrene resins such as polystyrene, AS resin, and ABS resin, polyester resins such as polyethylene terephthalate (PET) and polybutylene terephthalate, fluorine resins such as polyethylene tetrafluoride resin, chlorine resins such as vinyl chloride, acrylic resin, polyamide resin such as nylon, polycarbonate resin, polyacetal resin, urea resin, epoxy resin, phenol resin, polyimide resin, and the like. One of them can be used singly or combination of two or more. Among the materials, a material having excellent elasticity and resistance to bending is preferable.

Moreover the material may be a fiber reinforced plastic obtained by containing short fibers in any of the resins. The short fibers can be used within a range in which no adverse influence is exerted on the flexibility of the IC card, and a short fiber can be suitably selected from any short fibers known in the art. Examples of the short fibers are carbon fibers, glass fibers and the like.

The size of the IC card base material is not particularly limited and can be suitably selected according to a purpose. For example, the size of a credit card is commonly accepted.

In the IC card of the present invention, the electric power generator and the display may be disposed on the card base material or buried in the card base material.

The protection layer is a layer for protecting the electric power generator, the display, and the like disposed on the card base material and its shape, structure, material, size, and the like can be suitably selected according to a purpose.

The shape is not particularly limited and can be suitably selected according to a purpose. For example, a sheet shape can be mentioned.

The structure is not particularly limited and can be suitably selected according to a purpose. For example, a single-layer structure, a laminated-layer structure, and the like can be included.

The material is not particularly limited and can be suitably selected according to a purpose. The materials of the card base materials can be suitably used.

The size may be the size of the whole surface of the IC card or a part of the surface. In the latter case, for example, the protection layer may be provided on the electric power generator, the display, and the like.

The wires are not particularly limited and can be suitably selected according to a purpose. Examples of the wires are wires for supplying the electric power generated by the electric power generator to the display, and wires for reading/writing information stored in the nonvolatile memory. Concretely, a lead wire, an antenna wire for transmitting/receiving a signal to/from a terminal such as an IC card reader, and the like can be mentioned.

The IC card of the present invention is designed that the display can be seen on surface of the display and the inside cannot be seen through the faces except for the surface of the display. It is preferable from the viewpoints of prevention of leakage of information, prevention of forgery, and the like. The both faces of such an IC card except for the surface of the display are preferably covered with opaque films and the like through which the inside cannot be seen.

The disposing positions of the electric power generator, the display, and the like in the IC card are not particularly limited and can be suitably selected according to a purpose. For example, a mode in which the electric power generator is disposed in an almost center portion and the display is disposed in an end portion is preferable. The mode has an advantage such that only by bending the center portion of the IC card, the electric power generator disposed in the center portion is driven to thereby generate electric power and information can be displayed on the display by the electric power.

When the electric power generator are disposed in the right end portion, the center portion, the left end portion, and the like of the IC card and the display driven by each of the electric power generator is disposed in a predetermined position in the IC card, for example, by bending only a portion in which the electric power generator for driving the display on which desired information is displayed is disposed in the IC card, the electric power generator is driven to thereby enable only necessary information to be displayed on the display.

The IC card of the present invention can be utilized in various fields in accordance with a method of operating a known IC card. Since internal information can be recognized, for example, by displaying information on the display by electric power generated by the electric power generator which is driven by the external stimulus, it is convenient.

The internal information can be suitably recognized by a method of operating an IC card of the present invention which will be described later.

The IC card of the present invention is very convenient as a contactless IC card and produces an excellent forgery preventing effect, so that the IC card can be favorably used in various fields such as of a finance and settlement field as a cash card, a credit card, a prepaid card, and so on; a public field as a resident general register, a health insurance card, a driving license, a passport, and so on; a communication/broadcasting field as a telephone card, a user identification module (UIM), satellite broadcasting card, and so on; a transportation/traffic field as a highway card, an ETC card, a railway/subway card, a bus card, and so on; a distribution/retail service field of a department store card, a convenience shop card, a shopping card, a vending machine card, a gasoline station card, a car maintenance card, and so on; an ID field of an employee ID card, a door key, a student ID card, and so on; and the other fields of a game card, an amusement card, a membership card, and so on.

Method of Operating IC Card

A method of operating an IC card of the present invention is a method of displaying the internal information of the IC card by generating electricity in the electric power generator by giving a stimulus from the outside to the IC card, driving the display by the electricity, and displaying information on the display. In the case where the display has the nonvolatile memory, at the time of displaying information on the display, it is preferable to read the information to be displayed on the display from the nonvolatile memory.

It is sufficient to properly select the stimulus in accordance with the kind of the electric power generator. For example, when the electric power generator is the piezoelectric transducer, the IC card is deformed within the range in which the IC card can be elastically deformed. For example, by bending the IC card or the like, electricity is generated in the piezoelectric transducer, the display is driven by the electricity, and information is displayed on the display. The deformation in this case includes all of deformations which can generate electricity in the piezoelectric transducer and also a slight deformation made by pressing the IC card or the like.

In the IC card using method of the present invention, the IC card is deformed within an elastic deformable range, and the piezoelectric transducer generates electricity. By the electricity, the display is driven and information is displayed on the display. As a result, the user can easily visually recognize the information in the IC card by taking a glance at the display.

As described above, the internal information of the IC card of the present invention can be read easily by the IC card using method of the present invention. Only by a simple operation of giving a stimulus from the outside to the IC card by, for example, deforming the card, the internal information can be read and displayed. In the case of an IC card having a prepaid function or the like of which balance has to be always indicated, the IC card of the present invention is very convenient.

Although embodiments of the present invention will be concretely described hereinafter, the invention is not limited thereto.

FIG. 1 is a schematic diagram for explaining an example of an IC card of the present invention. An IC card 1 shown in FIG. 1 has a piezoelectric transducer 2, an LSI chip 5, an electrochromic display device 10, a lead wire (not shown), and an antenna wire (not shown) which are buried in a card base material 100 having a thickness of 0.76 mm. Different from FIG. 1, in reality, the piezoelectric transducer 2, the LSI chip 5, the electrochromic display device 10, the lead wire, the antenna line, and the like cannot be seen from the surface of the card base material 100.

The piezoelectric transducer 2 supplies electric power to the electrochromic display device 10 and the LSI chip 5. The piezoelectric transducer 2 is a bimorph device made of $PbZrTiO_3$ (lead zirconate titanate) material of 60 mm (length)×20 mm (width) ×0.6 mm (thickness). When bending is given with a displacement of 1 mm, a power generation amount of 11V (voltage between peaks) is obtained. Electricity generated by the piezoelectric transducer 2 is supplied to the electrochromic display device 10, LSI chip 5, and the like through the lead wire which makes the piezoelectric transducer 2, electrochromic display device 10, LSI chip 5, and the like conductive.

Figure 2:
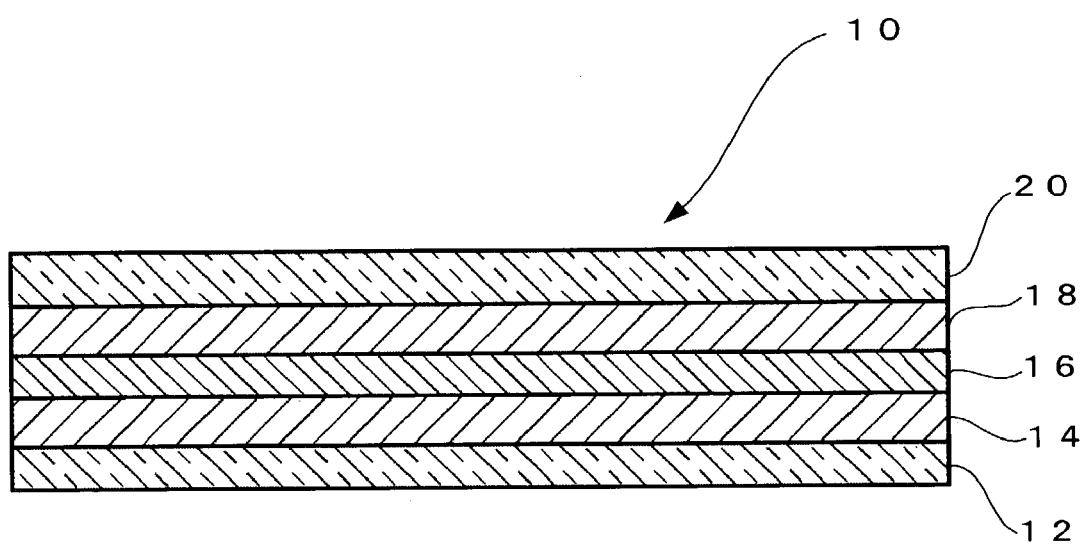
FIG. 2 is a schematic cross section for explaining an example of a display in the IC card of the present invention.

The electrochromic display device 10 has, as shown in FIG. 2, a structure in which a substrate 12, a first electrode 14, an electrochromic layer 16, a second electrode 18, and a transparent protection layer 20 are laminated in this order. The electrochromic display device 10 is an all solid-state electrochromic display device and the electrochromic layer 16 is formed of polyaniline (oxidation state: cyan, neutral state: light yellow, reduction state: none). The electrochromic display device 10 can be driven by a voltage of about 3V, so that it can be sufficiently driven by electricity generated by the piezoelectric transducer 2. Since an aqueous electrolyte is not used, there is no fear of liquid leakage and the like. Handling easiness, safety, and the like are excellent.

The LSI chip 5 has a nonvolatile memory. As the nonvolatile memory, a ferroelectric expressed by the expression PLZT ($Pb_yLa_{1-y}Zr_xTi_{1-x}O_3$) is used.

The IC card 1 can transmit/receive a signal to/from an external terminal through the antenna wire. Consequently, the IC card can be used as a normal IC card and, by the IC card using method of the present invention, information stored in the IC card can be easily displayed. The user can check the use state and the like of the IC card 1 at a glance.

Figure 3A:
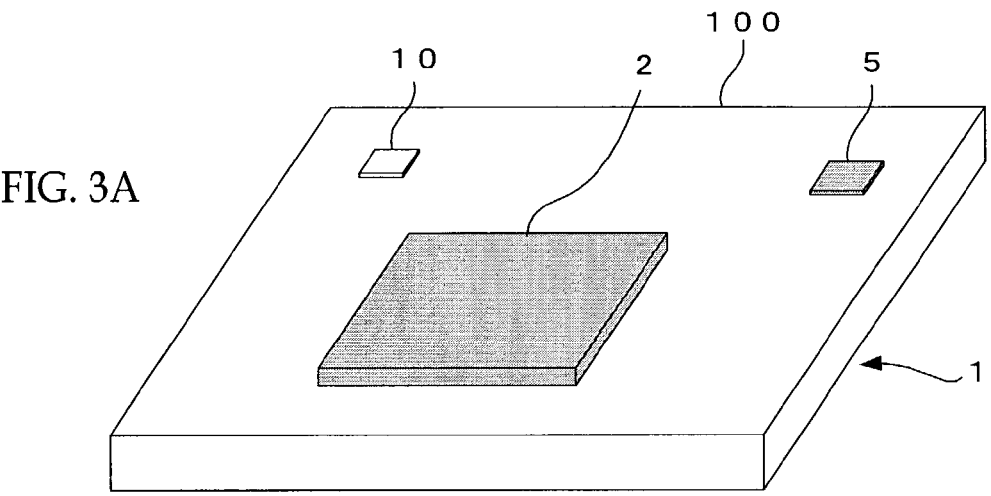
FIGS. 3A, 3B and 3C are schematic diagrams for explaining an example of a method of operating the IC card of the present invention.

Specifically, as shown in FIG. 3A, before the IC card 1 is deformed, no electricity is generating in the piezoelectric transducer 2, the electrochromic display device 10 is not driven, and nothing is displayed.

Figure 3B:
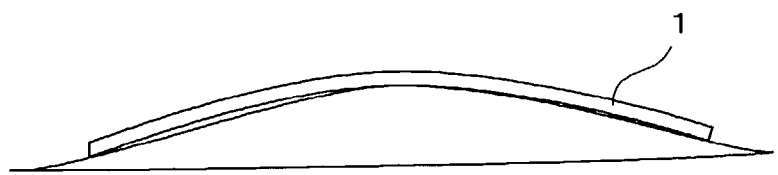

As shown in FIG. 3B, when the IC card 1 is deformed within the elastic deformable range so that its center portion is bent, the piezoelectric transducer 2 generates electricity by the piezoelectric action. In the case where the center portion of the IC card 1 is bent about 1 mm (usually, about 1 mm to 4 mm), electricity of 11V (voltage between peaks) is generated. The voltage of the electricity is transmitted to the electrochromic display device 10 through the lead wire. The electricity is transmitted through the lead wire to the LSI chip 5, and information stored in the ferroelectric in the LSI chip 5 is read out. The information is transmitted to the electrochromic display device 10 through the lead wire.

Figure 3C:
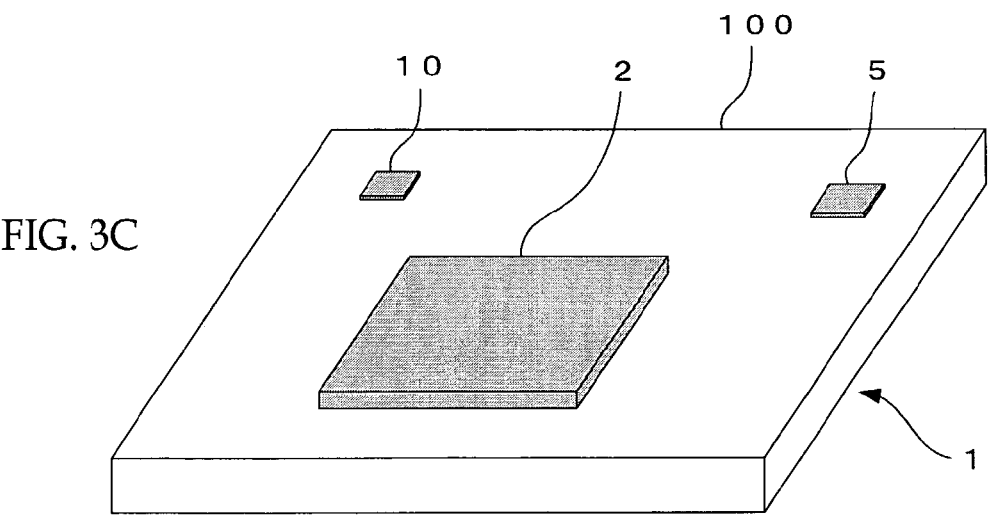

As shown in FIG. 3C, the information is displayed according to, for example, used rate, the remaining amount, and the like on the electrochromic display device 10. Specifically, in the case where the IC card is a prepaid contactless railway card, it is set so that when the remaining amount becomes less than 140 yen, the electrochromic display device 10 generates "red color" and when the remaining amount is 140 yen or more, the electrochromic display device 10 generates "blue color". In such a manner, the user can easily understand the information of the remaining amount by the color.

In the example, the electrochromic display device 10 has only the information amount of one bit of changing the color of the electrochromic display device 10. In the present invention, by properly selecting the display, information of a larger information amount of numerals, characters, and the like can be also displayed. The threshold of 140 yen in the example can be changed by suitably operating an external terminal such as a card reader.

By providing a plurality of electrochromic display devices 10 and piezoelectric transducers, different information can be displayed. Specifically, for example, the IC card may be designed as follows. When the right end portion of the IC card is deformed, the remaining amount is displayed in color by a first electrochromic display device. When the IC card is deformed so that its center portion is bent, the use frequency is displayed in color by a second electrochromic display device. When the left end portion of the IC card is deformed so as to be bent, other information is displayed in color.

According to the present invention, an IC card and a method of operating the same, can be provided, which can be suitably used in various fields such as of a finance/settlement field as a cash card, a credit card, a prepaid card, and the like; a public field as a resident general register, a health insurance card, a driving license, a passport, and the like; a communication/broadcasting field of a telephone card, a user identification module (UIM), a satellite broadcasting card, and the like; a transportation/traffic field as a highway card, an ETC card, a railway/subway card, a bus card, and the like; a distribution/retail service field as a department card, a convenience shop card, a shopping card, a vending machine card, a gasoline station card, a car maintenance card, and the like; an ID field as an employee ID card, a door key, a student ID card, and the like; and the other fields as a game card, an amusement facility card, a membership card, and the like. The IC card and the method for operating the same of the present invention, moreover, can be easily designed as a contactless IC card requiring no special additional device, there is no fear of a liquid leakage of an electrolyte liquid and the like, it is unnecessary to mount a power supply source such as a battery, and information can be displayed easily and cheaply by the voltage of electricity internally generated only for time which does not hinder a practical use even after the voltage is stopped applying.

What is claimed is:

1. An IC card comprising:
    a piezoelectric transducer capable of generating electric power by an external stimulus; and
    a display driven by the electric power generated by the piezoelectric transducer so as to display information,
    wherein the external stimulus is applied by bending the IC card into a curved shape,
    wherein the piezoelectric transducer is disposed in a portion of the IC card where curvature occurs and the display is disposed in a portion where no curvature occurs, and
    wherein the piezoelectric transducer contains at least one inorganic material or at least one organic material, where the inorganic material is selected from $PbLaZr\text{-}TiO_3$, $SrBi_2Ta_2O_9$, $(Bi, La)_4Ti_3O_{12}$, and $Bi_4Ti_3O_{12}$, and the organic material is selected from polyethylene trifluoride, polyethylene tetrafluoride, a copolymer of vinylidene fluoride and ethylene trifluoride, a copolymer of vinylidene fluoride and ethylene tetrafluoride, polyvinyl alcohol, polyethylene terephthalate, polyoxymethylene, polyethylene, polypropylene, polyphenyl sulfide, crystalline polystyrene, crystalline polymethacrylate, and crystalline polycarbonate.

2. An IC card according to claim 1, wherein the display can display information by the electric power generated by the piezoelectric transducer when the IC card is elastic-deformed.

3. An IC card according to claim 1, wherein the display can display information for predetermined time even after the electric power from the piezoelectric transducer is interrupted.

4. An IC card according to claim 1, further comprising a nonvolatile memory for storing information display by the display.

5. An IC card according to claim 4, wherein the nonvolatile memory is a ferroelectric random access memory (FeRAM).

6. An IC card according to claim 1, wherein the display is formed by an electrochromic display device.

7. An IC card according to claim 6, wherein the electrochromic display device is an all solid-state electrochromic display device.

8. An IC card according to claim 7, wherein the all solid-state electrochromic display device contains a self-doped conductive polymer.

9. An IC card according to claim 8, wherein the self-doped conductive polymer is at least one of poly(isothianaphthene sulfonic acid), poly(thiophene alkane sulfonic acid), poly(pyrrole alkane sulfonic acid), poly(aniline sulfonic acid), poly(carbazole-N-alkane sulfonic acid), poly(phenylene/oxyalkane sulfonic acid), poly(thiopene alkane carboxylic acid), poly(isothianaphthene-5-sulfonic acid-co-isothianaphthene), poly(thiophene-3-alkane sulfonic acid-co-thiophene), poly(pyrrole-3-alkane sulfonic acid-co-pyrrole), poly(aniline sulfonic acid-co-aniline), poly(carbazole-N-alkane sulfonic acid-co-carbazole), poly(phenylene-oxyalkane sulfonic acid-co-phenylene), and poly(thiophene-3-alkane carboxylic acid-co-thiophene).

10. An IC card according to claim 8, wherein the self-doped conductive polymer is at least one type of N-vinyl-carbon acid amid polymers.

11. An IC card according to claim 7, wherein the all solid-state electrochromic display device contains a π-conjugated polymer.

12. An IC card according to claim 11, wherein the π-conjugated polymer is at least one of polyaniline, poly(o-phenylendiamine), poly(methanilic acid), poly(thiophene-2, 5-diyl), poly(3-methylthiophene), poly(3,4-dimethylthiophene), poly(1,3-bis-2-thienyl benzene), polyisothianaphthene, polypyrrole, poly(2,5-pyridinediyl), poly(6-hexyl-2,5-pyridinediyl), poly(1,4-isoquinoline diyl), poly(2,5-pyrimidine diyl), poly(5,8-quinoxalinediyl), polyvinylquaterthiophene, poly(2,6-quinolinediyl), and poly(2-methyl-1,4-anthraquinonediyl).

13. An IC card according to claim 1, wherein the piezoelectric transducer is disposed in a center portion thereof and the display is disposed in an end portion thereof.

14. An IC card according to claim 1, wherein a portion of a surface of the IC card where the display is disposed is transparent so as to be able to see through the display, and other portion of the surface is opaque so as not to show an internal structure.

15. A method of operating an IC card comprising the steps of:
    bending the IC card into a curved shape within an elastic deformable range so as to generate electric power in a piezoelectric transducer; and driving a display by the electric power so as to display information on the display, wherein the IC card comprises the piezoelectric transducer, and the display, wherein the piezoelectric transducer is disposed in a portion of the IC card where curvature occurs and the display is disposed in a portion where no curvature occurs, and wherein the piezoelectric transducer contains at least one inorganic material or at least one organic material, where the inorganic material is selected from $PbLaZrTiO_3$, $SrBi_2Ta_2O_9$, $(Bi, La)_4Ti_3O_{12}$, and $Bi_4Ti_3O_{12}$, and the organic material is selected from polyethylene trifluoride, polyethylene tetrafluoride, a copolymer of vinylidene fluoride and ethylene trifluoride, a copolymer of vinylidene fluoride and ethylene tetrafluoride, polyvinyl alcohol, polyethylene terephthalate, polyoxymethylene, polyethylene, polypropylene, polyphenyl sulfide, crystalline polystyrene, crystalline polymethyl methacrylate, and crystalline polycarbonate.

16. A method of operating an IC card comprising the steps of:

bending the IC card into a curved shape within an elastic deformable range so as to generate electric power in a piezoelectric transducer;

driving a display by the electric power so as to display information on the display; and reading the information to be displayed from a nonvolatile memory at the time of displaying the information on the display;

wherein the IC card comprises the piezoelectric transducer, the display and the nonvolatile memory, wherein the piezoelectric transducer is disposed in a portion of the IC card where curvature occurs and the display is disposed in a portion where no curvature occurs, and wherein the piezoelectric transducer contains at least one inorganic material or at least one organic material, where the inorganic material is selected from $PbLaZrTiO_3$, $SrBi_2Ta_2O_9$, $(Bi, La)_4Ti_3O_{12}$, and $Bi_4Ti_3O_{12}$, and the organic material is selected from polyethylene trifluoride, polyethylene tetrafluoride, a copolymer of vinylidene fluoride and ethylene trifluoride, a copolymer of vinylidene fluoride and ethylene tetrafluoride, polyvinyl alcohol, polyethylene terephthalate, polyoxymethylene, polyethylene, polypropylene, polyphenyl sulfide, crystalline polystyrene, crystalline polymethyl methacrylate, and crystalline polycarbonate.

* * * * *